US008018635B2

(12) United States Patent
Tokie

(10) Patent No.: US 8,018,635 B2
(45) Date of Patent: Sep. 13, 2011

(54) INFORMATION RECORDING SYSTEM AND METHOD, INFORMATION REPRODUCING SYSTEM AND METHOD, INFORMATION RECORDING AND REPRODUCING SYSTEM, MANUSCRIPT DATA PROCESSING APPARATUS, REPRODUCTION DATA PROCESSING APPARATUS, STORAGE MEDIUM STORING MANUSCRIPT DATA PROCESSING PROGRAM THEREON, AND STORAGE MEDIUM STORING REPRODUCTION DATA PROCESSING PROGRAM THEREON

(75) Inventor: Katsuji Tokie, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 976 days.

(21) Appl. No.: 11/350,640

(22) Filed: Feb. 9, 2006

(65) Prior Publication Data

US 2007/0019260 A1 Jan. 25, 2007

(30) Foreign Application Priority Data

Jul. 21, 2005 (JP) ................................. 2005-211652

(51) Int. Cl.
*H04N 1/46* (2006.01)
(52) U.S. Cl. ....... 358/540; 358/3.28; 358/539; 382/199; 382/218; 382/224; 382/232; 382/239
(58) Field of Classification Search .......... 358/539–540; 382/199, 218, 224, 232, 239; 713/176–179
See application file for complete search history.

(56) References Cited

U.S. PATENT DOCUMENTS

| 5,815,252 | A  | * | 9/1998 | Price-Francis | 356/71 |
|---|---|---|---|---|---|
| 5,896,489 | A  | * | 4/1999 | Wada | 358/1.2 |
| 6,584,223 | B1 | * | 6/2003 | Shiiyama | 382/173 |
| 7,010,170 | B2 | * | 3/2006 | Saito | 382/239 |
| 7,016,420 | B1 | * | 3/2006 | Kagechi et al. | 375/240.26 |
| 7,017,816 | B2 | * | 3/2006 | Yen et al. | 235/462.25 |
| 7,149,000 | B1 | * | 12/2006 | Sakai et al. | 358/3.28 |
| 7,548,340 | B2 | * | 6/2009 | Ishikawa et al. | 358/1.9 |
| 7,656,559 | B2 | * | 2/2010 | Goldberg et al. | 358/3.28 |
| 2003/0117262 | A1 | * | 6/2003 | Anderegg et al. | 340/5.53 |
| 2003/0147549 | A1 | * | 8/2003 | Choi et al. | 382/100 |
| 2003/0169456 | A1 | * | 9/2003 | Suzaki | 358/3.28 |
| 2004/0117627 | A1 | * | 6/2004 | Brewington | 713/176 |
| 2004/0153653 | A1 | * | 8/2004 | Abhyankar et al. | 713/179 |
| 2004/0234139 | A1 | * | 11/2004 | Moroo et al. | 382/232 |
| 2005/0152006 | A1 | * | 7/2005 | Abe et al. | 358/3.28 |
| 2006/0072135 | A1 | * | 4/2006 | Umezawa et al. | 358/1.9 |
| 2006/0103901 | A1 | * | 5/2006 | Udagawa et al. | 358/521 |
| 2006/0153447 | A1 | * | 7/2006 | Ouchi | 382/173 |
| 2007/0127077 | A1 | * | 6/2007 | Tamura | 358/3.28 |

FOREIGN PATENT DOCUMENTS

JP 2004240969 8/2004

\* cited by examiner

*Primary Examiner* — Chan S Park
*Assistant Examiner* — Dung Tran
(74) *Attorney, Agent, or Firm* — Gesmer Updegrove LLP

(57) ABSTRACT

An information recording system includes an image generating unit that generates, from input manuscript data, image data of the manuscript; a characteristic data extracting unit that extracts, from the image data, characteristic data indicating a characteristic of the image data generated by the image generating unit; a characteristic data coding unit that encodes the characteristic data; and an image forming unit that forms the image data on an image recording medium together with the encoded characteristic data.

10 Claims, 6 Drawing Sheets

INFORMATION RECORDING SYSTEM AND METHOD, INFORMATION REPRODUCING SYSTEM AND METHOD, INFORMATION RECORDING AND REPRODUCING SYSTEM, MANUSCRIPT DATA PROCESSING APPARATUS, REPRODUCTION DATA PROCESSING APPARATUS, STORAGE MEDIUM STORING MANUSCRIPT DATA PROCESSING PROGRAM THEREON, AND STORAGE MEDIUM STORING REPRODUCTION DATA PROCESSING PROGRAM THEREON

PRIORITY INFORMATION

This application claims priority to Japanese Patent Application No. 2005-211652, filed on Jul. 21, 2005, which is incorporated herein by reference in its entirety.

BACKGROUND OF THE INVENTION

1. Field of the Invention

The present invention relates to an information recording system generating the image data of a manuscript image from digital manuscript data in order to record the manuscript image on an image recording medium, an information reproducing system reproducing image data from an image recording medium, and an information recording and reproducing system including these information recording system and information reproducing system.

2. Description of the Related Art

Although digital data has many advantages, such as being processable by a computer or the like, digital data is also disadvantageous in that digital media have a relatively short life, a greater dependence on specific hardware and software (including the need for proprietary hardware or software for viewing the information expressed by the data, and the short product lives of the hardware and the software), the possibility of the breakage of the data in its entirety caused by damage at a portion, relative ease of alteration of the data, and the like. On the other hand, although analog data such as a microfilm and the like is disadvantageous in that it cannot be readily processed by a computer, analog data also has many advantages, including a long shelf life, independence from hardware and software, difficulty of alteration and legal admissibility as evidence, and the like. Accordingly, there has been an ongoing effort towards the hybridization of analog and digital techniques.

A computer output microfilm (COM) analog-digital hybrid system for recording digital data directly on a microfilm has been known.

FIG. 6 is a block diagram showing the configuration of a conventional COM system. In FIG. 6, a manuscript data processing apparatus 10' is composed of a computer. The manuscript data processing apparatus 10' generates the image data of a manuscript image indicating the contents of the manuscript data from input digital data (manuscript data), which is a long-term storage object, and transfers the generated image data to a film writer 20'. The film writer 20' prints a manuscript image on a microfilm (hereinafter suitably referred to as an "MF") based on the received image data. In the COM system, digital manuscript data is thus recorded on a microfilm. In addition, the manuscript image recorded on the microfilm is optically read using, for example, a film scanner 30', and image data is reproduced from the microfilm.

In such a system, there are no methods of objectively evaluating the reproducibility of reproduction data, that is, there are no mean for objectively confirming the identity of the data saved on the microfilm and the data reproduced from the microfilm, in the event that the manuscript data was lost. Consequently, whether or not reproduced image data can have the property as the script of a microfilm greatly depend on occasional practical standards, operator competence, and the like.

SUMMARY OF THE INVENTION

According to one aspect of the present invention, there is provided an information recording system, having: an image generating unit that generates, from input manuscript data, image data of the manuscript; a characteristic data extracting unit that extracts, from the image data, characteristic data indicating a characteristic of the image data generated by the image generating unit; a characteristic data coding unit that encodes the characteristic data; and an image forming unit that forms the image data on an image recording medium together with the encoded characteristic data.

According to another aspect of the present invention, there is provided an information reproducing system, having: an image reading unit that reads an image from an image recording medium on which a manuscript image is formed together with encoded characteristic data which indicate a characteristic of the manuscript image; a reproduction characteristic data extracting unit that extracts, from the manuscript image, reproduction characteristic data which indicate a characteristic of the manuscript image; a characteristic data decoding unit that decodes the encoded characteristic data; and a determination unit that determines whether the reproduction characteristic data extracted by the reproduction characteristic data extracting unit and the characteristic data decoded by the characteristic data decoding unit are identical.

According to another aspect of the present invention, there is provided an information recording and reproducing system having: an image generating unit that generates, from input manuscript data, data of a manuscript image; a characteristic data extracting unit that extracts, from the data of the manuscript image, characteristic data indicating a characteristic of the manuscript image; a characteristic data coding unit that encodes the characteristic data; an image forming unit that forms the data of the manuscript image on an image recording medium together with the encoded characteristic data; an image reading unit that reads an image from an image recording medium on which a manuscript image is formed together with encoded characteristic data to generate image data of a reproduced manuscript image and a reproduced encoded image; a reproduction characteristic data extracting unit that extracts, from the reproduced manuscript image, reproduction characteristic data which indicate a characteristic of the reproduced manuscript image; a characteristic data decoding unit that decodes the encoded characteristic data; and an output unit that outputs information about identity of the manuscript image and the reproduced manuscript image, based on the reproduction characteristic data and the decoded characteristic data.

According to another aspect of the present invention, there is provided an information recording method, having: generating, from input manuscript data, image data of the manuscript; extracting, from the image data, characteristic data indicating a characteristic of the image data; encoding the characteristic data; and forming the image data on an image recording medium together with the encoded characteristic data.

According to another aspect of the present invention, there is provided an information reproducing method having: reading an image from an image recording medium on which a manuscript image is formed together with encoded characteristic data which indicate a characteristic of the manuscript image; extracting, from the manuscript image, reproduction characteristic data which indicate a characteristic of the manuscript image; decoding the encoded characteristic data; and determining whether the reproduction characteristic data and the decoded characteristic data are identical.

According to another aspect of the present invention, there is provided a manuscript data processing apparatus, having: an image generating unit that generates, from input manuscript data, image data of the manuscript; a characteristic data extracting unit that extracts, from the image data, characteristic data indicating a characteristic of the image data generated by the image generating unit; a characteristic data coding unit that encodes the characteristic data; and an image synthesizing unit that generates image data including the image data of the manuscript and the encoded characteristic data.

According to another aspect of the present invention, there is provided a reproduction data processing apparatus, having: reproduction data inputting unit that receives reproduced image data which have been generated by reading an image from an image recording medium on which a manuscript image is formed together with encoded characteristic data which indicate a characteristic of the manuscript image; a reproduction characteristic data extracting unit that extracts, from the manuscript image, reproduction characteristic data which indicate a characteristic of the manuscript image; a characteristic data decoding unit that decodes the encoded characteristic data; and a determination unit that determines whether the reproduction characteristic data extracted by the reproduction characteristic data extracting unit and the characteristic data decoded by the characteristic data decoding unit are identical.

According to another aspect of the present invention, there is provided a storage medium readable by a computer, the storage medium storing a program of instructions executed by the computer to perform a function for processing manuscript data, the function having: generating, from input manuscript data, image data of the manuscript; extracting, from the image data, characteristic data indicating a characteristic of the image data; encoding the characteristic data; and generating image data including the image data of the manuscript and the encoded characteristic data.

According to another aspect of the present invention, there is provided a storage medium readable by a computer, the storage medium storing a program of instructions executed by the computer to perform a function for processing reproduction data, the function having: receiving reproduced image data which have been generated by reading an image from an image recording medium on which a manuscript image is formed together with encoded characteristic data which indicate a characteristic of the manuscript image; extracting, from the manuscript image, reproduction characteristic data which indicate a characteristic of the manuscript image; decoding the encoded characteristic data; and determining whether the reproduction characteristic data and the decoded characteristic data are identical.

According to another aspect of the present invention, there is provided an information reproducing system, having: an image reading unit that reads an image from an image recording medium on which a manuscript image is formed together with encoded characteristic data which indicate a characteristic of the manuscript image to generate image data of a reproduced manuscript image and a reproduced encoded image; a reproduction characteristic data extracting unit that extracts, from the reproduced manuscript image, reproduction characteristic data which indicate a characteristic of the reproduced manuscript image; a characteristic data decoding unit that decodes the encoded characteristic data; and an output unit that outputs information about identity of the manuscript image and the reproduced manuscript image, based on the reproduction characteristic data and the decoded characteristic data.

According to another aspect of the present invention, there is provided an information reproducing method, having: reading an image from an image recording medium on which a manuscript image is formed together with encoded characteristic data which indicate a characteristic of the manuscript image to generate image data of a reproduced manuscript image and a reproduced, encoded image; extracting, from the reproduced manuscript image, reproduction characteristic data which indicate a characteristic of the reproduced manuscript image; decoding the encoded characteristic data; and outputting information about identity of the manuscript image and the reproduced manuscript image, based on the reproduction characteristic data and the decoded characteristic data.

According to another aspect of the present invention, there is provided a storage medium readable by a computer, the storage medium storing a program of instructions executed by the computer to perform a function for processing reproduction data, the function having: receiving reproduced image data which have been generated by reading an image from an image recording medium on which a manuscript image is formed together with encoded characteristic data which indicate a characteristic of the manuscript image; extracting, from the reproduced manuscript image, reproduction characteristic data which indicate a characteristic of the reproduced manuscript image; decoding the encoded characteristic data; and outputting information about identity of the manuscript image and the reproduced manuscript image, based on the reproduction characteristic data and the decoded characteristic data.

BRIEF DESCRIPTION OF THE DRAWINGS

Embodiments of the present invention will be described in detail based on the following figures, wherein.

DETAILED DESCRIPTION OF THE INVENTION

In the following, embodiments of the present invention will be described with reference to the attached drawings.

First Embodiment

Figure 1:
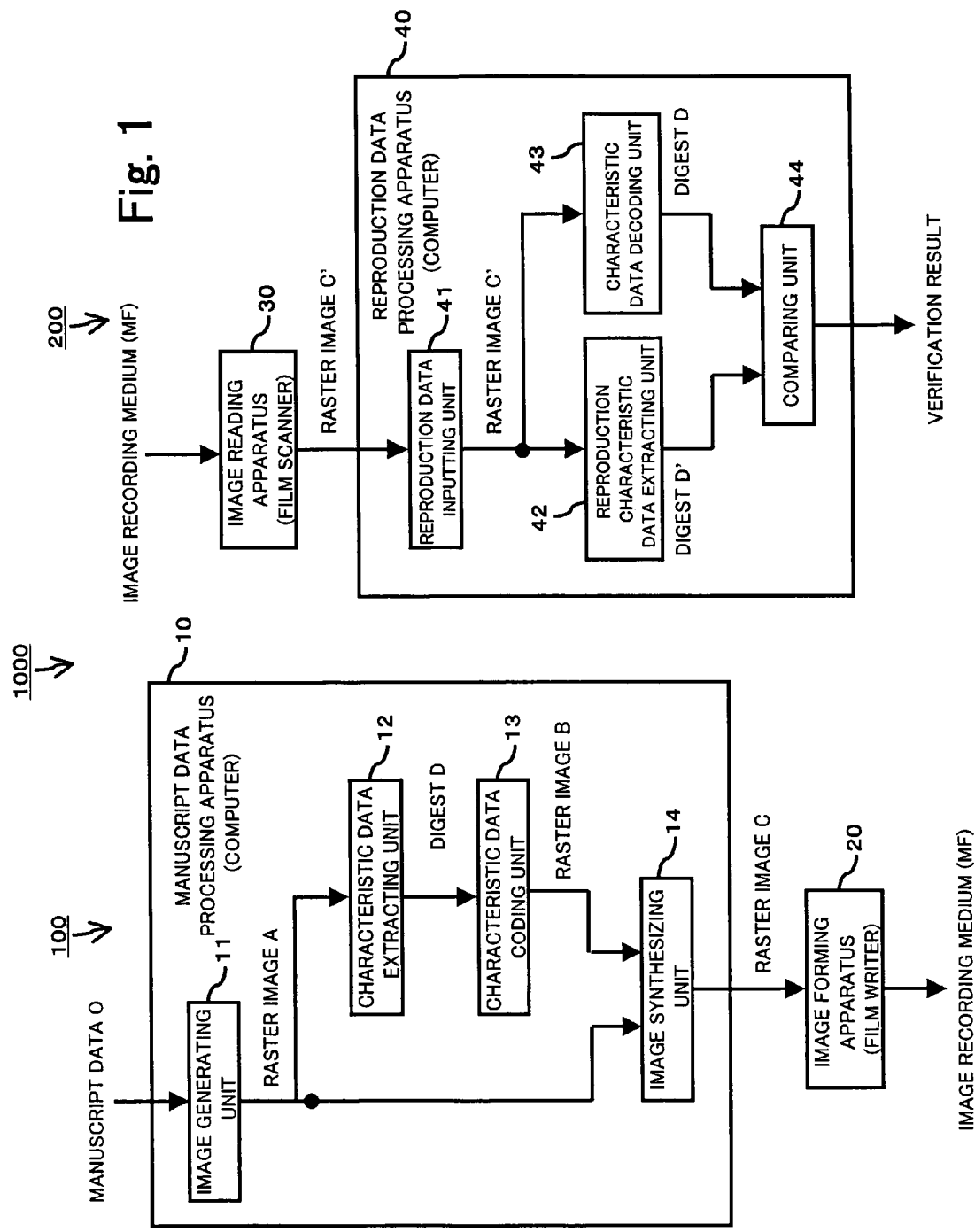
FIG. 1 is a block diagram showing the configuration of an information recording and reproducing system according to a first embodiment of the present invention.

FIG. 1 is a block diagram showing the configuration of an information recording and reproducing system 1000 according to a first embodiment of the present invention. In FIG. 1, the information recording and reproducing system 1000 includes an information recording system 100 and an information reproducing system 200.

<Configuration of Information Recording System>

The information recording system 100 is a system which generates from input digital manuscript data image data of a manuscript image expressing the content of the manuscript data, and which records the manuscript image on an image recording medium based on the image data. In the following, microfilm (MF) will be described as an example recording medium as microfilm provides advantages such as a as long storage life, relatively small size, high resolution, the legal admissibility of evidence, and the like. However, other media such as paper or the like may be used as the image recording medium as long as an optically-readable image can be formed on the media. As shown in FIG. 1, the information recording system 100 is equipped with a manuscript data processing apparatus 10 and an image forming apparatus 20.

The manuscript data processing apparatus 10 is an apparatus which processes manuscript data to generate the image data of an image to be formed on the image recording medium in a format usable by the image forming apparatus 20 (for example, a raster format such as TIFF or the like). Here, the manuscript data processing apparatus 10 is a computer including a CPU, a ROM, a RAM, an external storage unit such as a hard disk and the like. Although in this example the functions of the manuscript data processing apparatus 10 are realized by the CPU's execution of a manuscript data processing program stored in a storage medium, the manuscript data processing apparatus 10 may be realized by other configurations. In FIG. 1, the manuscript data processing apparatus 10 includes an image generating unit 11, a characteristic data extracting unit 12, a characteristic data coding unit 13, and an image synthesizing unit 14.

The image generating unit 11 generates from the input manuscript data the image data of a manuscript image which expresses the contents of the input manuscript data in a form directly understandable to a human viewer. Here, the manuscript data may be input from an external computer through a network, or may be input through a portable recording medium such as a CD-R, a flash memory, or the like, or may be input from a storage unit in the manuscript data processing apparatus 10. The manuscript data is digital data convertible into an image meaningful to a human viewer, such as document data produced by word-processing software, data produced by spreadsheet software, data for presentation software, CAD data, a software program, or the like. Here, when it is described that the content is expressed in a manner that can be directly understood by a human being, is used to explain that the content is expressed in a manner or mode in which a person viewing the content in that form can understand the semantic content, in other words that the content is expressed in a mode meaningful to a human viewer, which includes expressing the contents using characters, marks, figures, images, or any combination of them. Specifically, for example, the image generating unit 11 generates the image data of a document from the document data of word-processing software, the image data of a drawing from CAD data, and the image data of a program listing from a software program. The expression of the data in such a manner, in a mode directly understandable to a human being in such a manner is performed in consideration of goals of reducing the dependence on hardware and software, avoiding the breakage of the data in its entirety caused by breakage at a portion, and the like. For example, the image generating unit 11 is equipped with the function of displaying a preview image of image data on a screen in the process of generating the image data, and receiving a correction operation of the preview image from a user so that the image data may be corrected based on the user-input correction operation.

The characteristic data extracting unit 12 extracts characteristic data indicating the characteristics of the image data generated by the image generating unit 11 from the image data. For example, the characteristic data extracting unit 12 calculates a hash value (digest) by applying a hash function to image data. However, the characteristic data may be in a form other than a digest, as long as the data enables the verification of the identity of the image data recorded on an image recording medium and the image data reproduced from the image recording medium.

The characteristic data coding unit 13 encodes the characteristic data extracted by the characteristic data extracting unit 12, and generates the image data of the encoded image expressing the characteristic data. For example, the characteristic data coding unit 13 generates image data such as a BASE 64 encoded image, a bar code image and a QR code image, all of which indicate the characteristic data.

The image synthesizing unit 14 generates the image data of a synthesized image composed of a manuscript image and an added encoded image based on the image data generated by the image generating unit 11 and the characteristic data coding unit 13. Specifically, the image synthesizing unit 14 generates the image data of a synthesized image so that the manuscript image and the encoded image may be arranged at predetermined positions in a microfilm frame.

The image forming apparatus 20 is an apparatus which forms a manuscript image on an image recording medium together with an encoded image based on the image data generated by the image synthesizing unit 14. In this example, the image forming apparatus 20 is a film writer which receives a raster image of a synthesized image from the manuscript data processing apparatus 10 via a wired or wireless communication path and prints a synthesized image on one frame of the microfilm based on the raster image.

<Configuration of Information Reproducing System>

The information reproducing system 200 is a system which optically reads an image from an image recording medium on which the image is formed by the information recording system 100 to reproduce image data. In FIG. 1, the information reproducing system 200 is equipped with an image reading apparatus 30 and a reproduction data processing apparatus 40.

The image reading apparatus 30 is an apparatus which optically reads an image from an image recording medium on which a synthesized image is formed by the image forming apparatus 20 to generate the image data of the synthesized image (hereinafter referred to as "reproduced image data"). Because a manuscript image and an encoded image may be included in a synthesized image, the image reading apparatus 30 generates the reproduced image data of the manuscript image and the encoded image. Here, the image reading apparatus 30 is a film scanner which optically reads the image of an microfilm to generate a raster image.

The reproduction data processing apparatus 40 is an apparatus which processes the reproduced image data generated by the image reading apparatus 30 to verify the identity of the image data recorded on the image recording medium and the image data reproduced from the image recording medium. Here, the reproduction data processing apparatus 40 is a computer including a CPU, a ROM, a RAM, an external storage unit such as a hard disk, and the like. The functions of the reproduction data processing apparatus 40 are realized by the CPU's execution of a reproduction data processing program stored in a storage medium. However, the reproduction data processing apparatus 40 may be realized by other configurations. In FIG. 1, the reproduction data processing apparatus 40 includes a reproduction data inputting unit 41, a reproduction characteristic data extracting unit 42, a characteristic data decoding unit 43 and a comparing unit 44.

The reproduction data inputting unit 41 receives the input of the reproduced image data of a synthesized image from the image reading apparatus 30 via a wire or wireless communication path.

The reproduction characteristic data extracting unit 42 extracts the reproduced image data of a manuscript image from the reproduced image data of the synthesized image input into the reproduction data inputting unit 41, and extracts the reproduction characteristic data indicating the characteristic of the reproduced image data from the reproduced image data of the manuscript image. Here, the reproduction characteristic data extracting unit 42 extracts the reproduction characteristic data using the same rule as the one by which the characteristic data extracting unit 12 extracts characteristic data. For example, the reproduction characteristic data extracting unit 42 applies a hash function (such as the function employed by the characteristic data extracting unit 12) to the reproduced image data to calculate a hash value (digest).

The characteristic data decoding unit 43 extracts the reproduced image data of an encoded image from the reproduced image data of the synthesized image input into the reproduction data inputting unit 41 and decodes the reproduced image data of the encoded image to obtain characteristic data.

The comparing unit 44 compares the reproduction characteristic data extracted by the reproduction characteristic data extracting unit 42 with the characteristic data obtained by the characteristic data decoding unit 43, and judges whether or not the two sets of data match. When it is judged that the two sets match, the image data reproduced from the image recording medium can be judged to be the same as the image data recorded on the image recording medium. When it is judged that the both do not match, the reproduced image data can be judged to not to be different from the recoded image data.

It should be noted that, in the configuration described above, the resolution of the image data of a manuscript image and the resolution of the image data of an encoded image may be set to a resolution capable of easily realizing a reproduction of the image data in consideration of the resolution of the image recording media such as the microfilm, the resolution of the film scanner, and the like.

Next, the operation of the information recording and reproducing apparatus 1000 having the configuration described above will be described in detail, with the description separated into description of the operation of the information recording system 100 and description of the operation of the information reproducing system 200.

<Operation of Information Recording System (MF Production Processing)>

Figure 2:
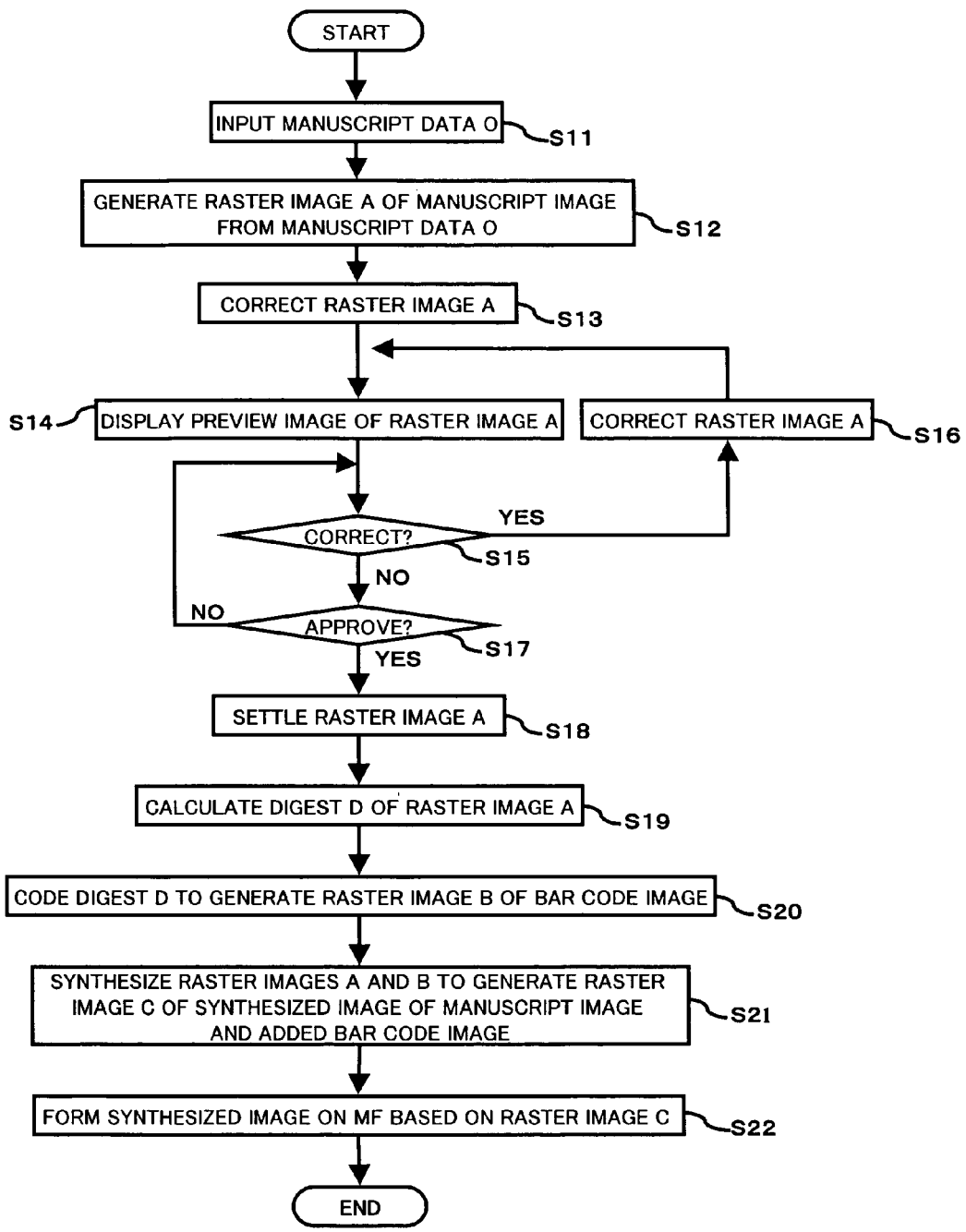
FIG. 2 is a flowchart showing an operation procedure of an information recording system.

FIG. 2 is a flowchart showing an example of the operational procedure of the information recording system 100 according to the present embodiment. In the following, the operation of the information recording system 100 is described with reference to FIG. 2.

The image generating unit 11 receives an input of manuscript data O, which is a long-term storage object, from an external computer or the like (Step S11). Subsequently, the image generating unit 11 generates a raster image A of the manuscript image indicating the contents of the input manuscript data O from the manuscript data O (Step S12), and the image generating unit 11 performs corrections of the raster image A such as the adjustment of the widths of fine lines which are judged to be difficult to reproduce by means of a microfilm (Step S13) before the image generating unit 11 displays a preview image of the raster image A on the screen of a not shown display (Step S14). Through the screen, the image generating unit 11 receives a correction operation and an approval operation of the preview image as input by a user. When the image generating unit 11 receives the correction operation (Yes at Step S15), the image generating unit 11 corrects the raster image A based on the correction operation (Step S16), and returns to Step S14. When the image generating unit 11 receives the approval operation (Yes at Step S17), the image generating unit 11 fixes the raster image A of the manuscript image, and transfers the fixed raster image to the characteristic data extracting unit 12 and the image synthesizing unit 14 (Step S18).

When the characteristic data extracting unit 12 receives the raster image A from the image generating unit 11, the characteristic data extracting unit 12 calculate a digest D of the raster image A and transfers the calculated digest D to the characteristic data coding unit 13 (Step S19).

When the characteristic data coding unit 13 receives the digest D from the characteristic data extracting unit 12, the characteristic data coding unit 13 encodes the digest D to generate the raster image B of a bar code image, and transfers the generated raster image B to the image synthesizing unit 14 (Step S20).

Figure 3:
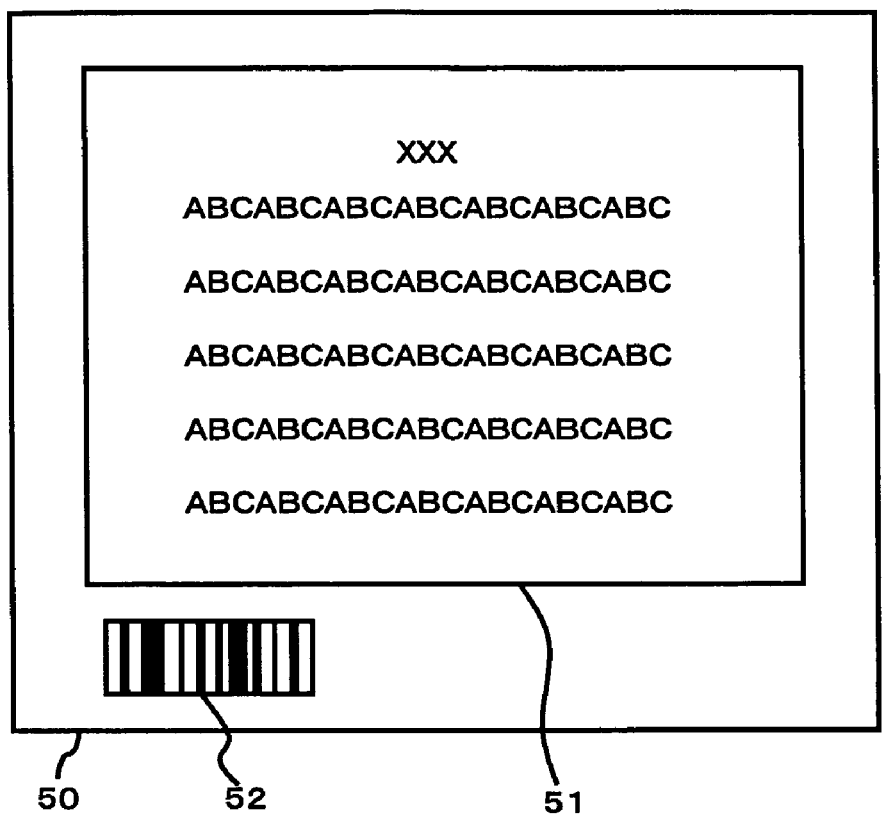
FIG. 3 is a view showing an example of a synthesized image according to the first embodiment.

The image synthesizing unit 14 synthesizes the raster image A of the manuscript image received from the image generating unit 11 and the raster image B of the bar code image received from the characteristic data coding unit 13 to generate a raster image C of the synthesized image composed of the manuscript image and the added bar code image (Step S21). Here, as shown in FIG. 3, the synthesized image is composed in a manner in which the manuscript image is arranged in a rectangular region 51 at a little to the upside at the center of a rectangular region 50 corresponding to the whole area of a frame of the microfilm and the bar code image is arranged in a rectangular region 52 below the rectangular region 51. Subsequently, the image synthesizing unit 14 transfers the raster image C of the synthesized image to the image forming apparatus (film writer) 20 via a communication path.

When the image forming apparatus 20 receives the raster image C of the synthesized image from the image synthesizing unit 14, the image forming apparatus 20 forms a synthesized image on the microfilm based on the raster image C (Step S22). Thereby, the synthesized image shown in FIG. 3 is recorded on the microfilm. That is, the manuscript image expressing the contents of the manuscript data O is recorded on the same frame of the microfilm together with the bar code image of the digest D calculated from the raster image A of the manuscript image. Thereby, the long-term storage of the manuscript data O by the recording on the microfilm is made possible.

In this manner, the information recording system 100 generates the raster image A and its digest D from the manuscript data O, which is the digital data of a long-term storage object, visualizes the digest D by the bar code, and stores it on the microfilm along with the visible image corresponding to the raster image A.

<Operation of Information Reproducing System (Image Reproduction and Verification Processing)>

Figure 4:
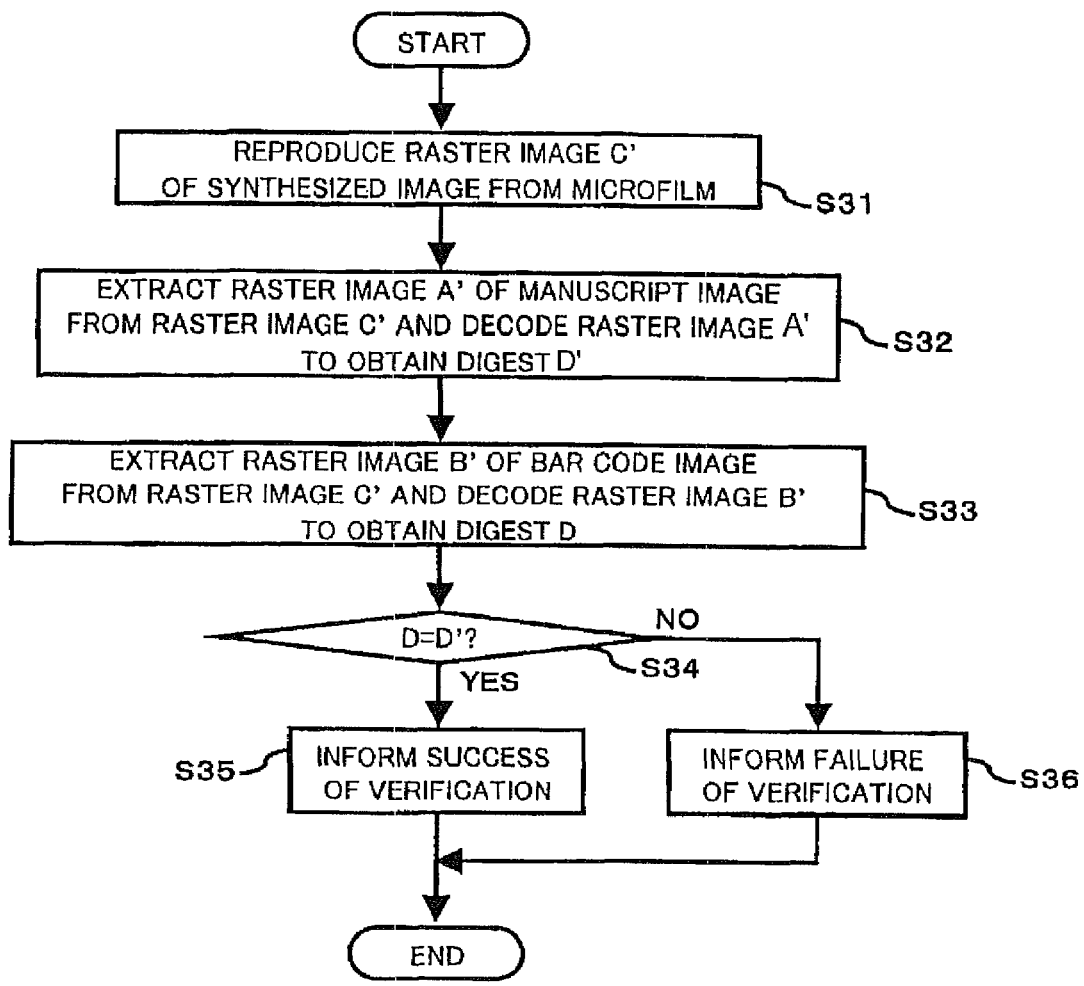
FIG. 4 is a flowchart showing an operation procedure of an information reproducing system.

FIG. 4 is a flowchart showing the operation procedure of the information reproducing system 200 according to the present embodiment. In the following, the operation of the information reproducing system 200 is described with reference to FIG. 4.

When a microfilm on which a synthesized image has been recorded by the information recording system 100 as described above is set in the image reading apparatus (film scanner) 30, the image reading apparatus 30 optically reads the image on the microfilm, and generates a raster image C' of the synthesized image (Step S31). The image reading apparatus 30 outputs the generated raster image C' to the reproduction data inputting unit 41 of the reproduction data processing apparatus 40 via a communication path.

When the reproduction data inputting unit 41 receives the raster image C' from the image reading apparatus 30, the reproduction data inputting unit 41 transfers the raster image C' to the reproduction characteristic data extracting unit 42 and the characteristic data decoding unit 43.

When the reproduction characteristic data extracting unit 42 receives the raster image C' from the reproduction data inputting unit 41, the reproduction characteristic data extracting unit 42 performs the region judgment of the region 51 of the manuscript image, and extracts the raster image A' of the manuscript image from the raster image C'. Then, the reproduction characteristic data extracting unit 42 calculates a digest D' of the raster image A' to transfer the calculated digest D' to the comparing unit 44 (Step S32).

When the characteristic data decoding unit 43 receives the raster image C' from the reproduction data inputting unit 41, the characteristic data decoding unit 43 performs the region judgment of the region 52 of the bar code image, and extracts the raster image B' of the bar code image from the raster image C'. Then, the characteristic data decoding unit 43 decodes the raster image B' to obtain the digest D, and transfers the obtained digest D to the comparing unit 44 (Step S33).

The comparing unit 44 compares the digest D' calculated by the reproduction characteristic data extracting unit 42 with the digest D decoded by the characteristic data decoding unit 43 to judge whether or not the two sets of data match (Step S34). When the comparing unit 44 judges that both match (Yes at Step S34), the comparing unit 44 informs the user of the success of the verification of the digest or the identity of the reproduced raster image A' and the raster image A recorded on the microfilm by a screen display or the like (Step S35). When the comparing unit 44 judges that the two sets of data do not match (No at Step S34), the comparing unit 44 informs the user of the failure of the verification of the digest or the nonidentity of the reproduced raster image A' and the raster image A recorded on the microfilm (Step S36). Thereby, the user can recognize the reproducibility, the property as the script, and the completeness of the reproduction data.

In this manner, when the information reproducing system 200 reproduces image data from a microfilm, the information reproducing system 200 confirms the identity of the data by means of a digest. That is, the information producing system 200 verifies the raster image generated by the film scan with the digest saved on the microfilm.

As described above, according to the present embodiment, the image data of a manuscript image which expresses the content of manuscript data in a form directly understandable to a human viewer is generated from the manuscript data. Then, according to the present embodiment, the characteristic data indicating the characteristic of the generated image data is extracted from the image data, and the extracted characteristic data is encoded to generate the image data of an encoded image which expresses the characteristic data. Furthermore, in the present embodiment, the manuscript image is formed on the image recording medium together with the encoded image based on the generated image data. Consequently, according to the present embodiment, it is possible to objectively confirm the identity of the image data recorded on the image recording medium and the image data reproduced from the image recording medium using the characteristic data decoded from the encoded image formed on the image recording medium at the time of reproduction.

Moreover, the system according to the present embodiment displays a preview image of the image data of a manuscript image on a screen at the time of generating the image data, and receives a correction operation of the preview image from a user to correct the image data based on the correction operation. Consequently, according to the present embodiment, adjustment of the widths of fine lines, which are difficult to reproduce, and the like can be performed, and the reproducibility of data can be improved.

Moreover, according to the present embodiment, the reproduced image data of a manuscript image and an encoded image are generated by optically reading the images from an image recording medium, on which the manuscript image is formed together with the encoded image based on the image data of the manuscript image expressing the content of manuscript data to be readily comprehensible to a human viewer, and the image data of the coded image indicating the characteristic data extracted from the image data of the manuscript image. Then, the reproduction characteristic data indicating the characteristic of the reproduction image data is extracted from the reproduced image data of the manuscript image and the characteristic data is decoded from the reproduced image data of the encoded image. Then, the system according to the present embodiment compares the reproduction characteristic data and the characteristic data to judge whether the two sets of data are in agreement or not. Consequently, according to the present embodiment, the identity of the image data recorded on an image recording medium and the image data reproduced from the image recording medium can be objectively confirmed based on a comparison judgment result.

Moreover, the quality of a delivered product can be confirmed by executing the verification according to the present embodiment upon delivery of a microfilm from an outside vendor contracted to produce the microfilm of the manuscript data.

Second Embodiment

In the following, an information recording and reproducing system 2000 according to a second embodiment of the present invention is described. Because the information recording and reproducing system 2000 is very similar to the information recording and reproducing system 1000 according to the first embodiment described above, common components are identified using the same labels, and their descriptions are not repeated.

<Configuration of Information Recording System>

According to the present embodiment, the characteristic data extracting unit 12 extracts the characteristic data indicating the characteristic of image data from the image data in a predetermined object region of a manuscript image. Here, the object region may be the whole region of the manuscript image, or may be some portion of the whole region of the manuscript image.

The image synthesizing unit 14 generates the image data of a synthesized image composed of a manuscript image with which an encoded image and region instructing marks are synthesized, based on the image data of the manuscript image generated by the image generating unit 11, the image data of the encoded image generated by the characteristic data coding unit 13, and the image data of the region instructing marks instructing the object region. Here, the image data of the region instructing marks preset and, for example, stored in the storage region in the information recording system 100.

<Configuration of Information Reproducing System>

The reproduction characteristic data extracting unit 42 extracts the reproduction characteristic data indicating the characteristic of reproduced image data from the reproduced image data of the object region identified by the region instructing marks in the reproduced image data of the synthesized image reproduced from an image recording medium.

In the following, the operation of the information recording and reproducing system 2000 will be described in detail, with the description separated into description of the operation of the information recording system 100 and description of the operation of the information reproducing system 200.

<Operation of Information Recording System (MF Production Processing)>

Figure 5:
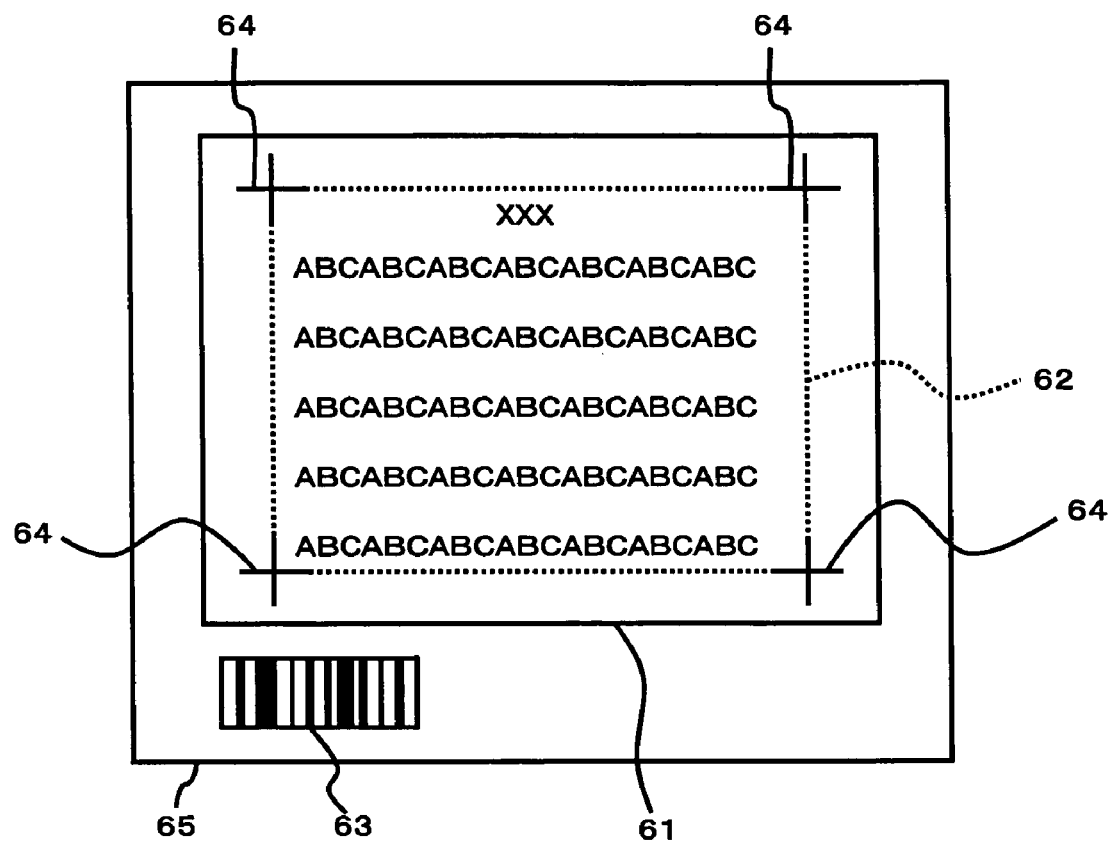
FIG. 5 is a view showing an example of a synthesized image according to a second embodiment of the present invention.
Figure 6:
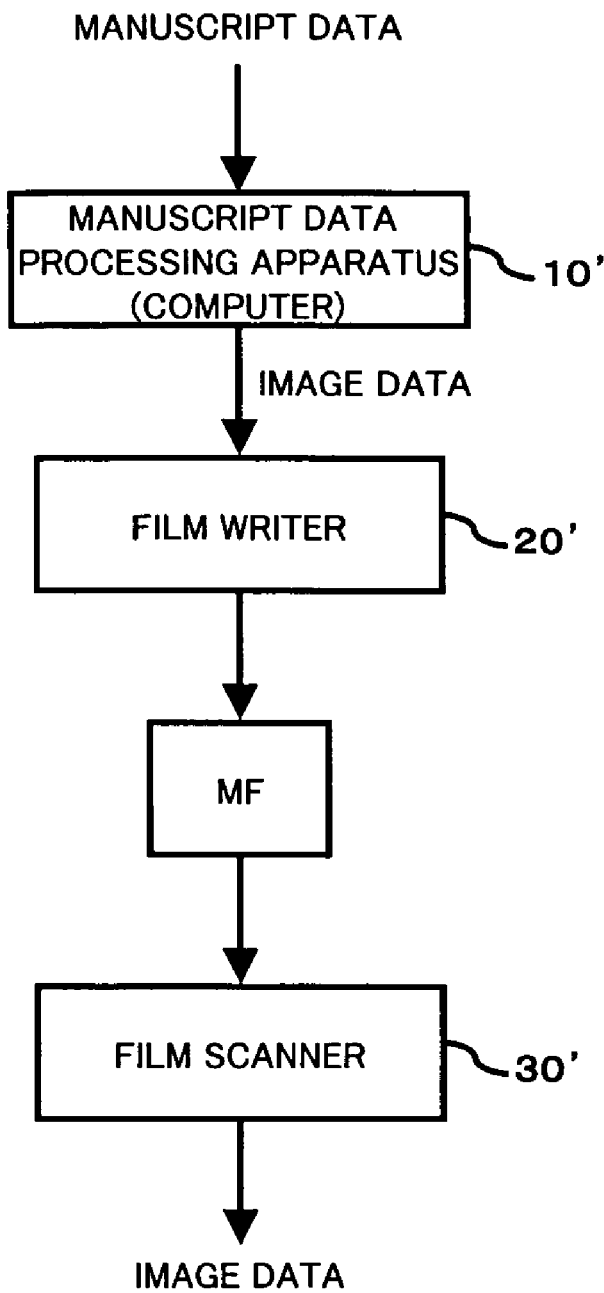
FIG. 6 is a block diagram showing the configuration of a conventional COM system.

As shown in FIGS. 1 and 5, the image generating unit 11 generates the raster image A of a manuscript image 61 from the manuscript data O, and transfers the generated raster image A to the characteristic data extracting unit 12 and the image synthesizing unit 14.

The characteristic data extracting unit 12 extracts the raster image A1 corresponding to an object region 62 in the manuscript image 61 from the raster image A, and calculates a digest D1 of the raster image A1 to transfer the calculated digest D1 to the characteristic data coding unit 13.

The characteristic data coding unit 13 encodes the digest D1 to generate the raster image B1 of a bar code image 63, and transfers the generated raster image B1 to the image synthesizing unit 14.

The image synthesizing unit 14 generates the raster image C1 of a synthesized image 65 composed of the manuscript image 61 with which the bar code image 63 and region instructing marks 64 are synthesized, based on the raster image A of the manuscript image 61, the raster image B1 of the bar code image 63, and the raster image M of the region instructing marks 64, such as register marks, instructing the object region 62 stored in a predetermined storage region. More specifically, as shown in FIG. 5, the synthesized image 65 is composed of an image produced by superimposing the region instructing marks 64 on the manuscript image 61, and the barcode image 63 arranged nearly to the manuscript image 61. The image synthesizing unit 14 transfers the raster image C1 of the synthesized image to the image forming apparatus 20.

The image forming apparatus 20 forms the synthesized image shown in FIG. 5 on a microfilm based on the raster image C1.

<Operation of Information Reproducing System (Image Reproducing and Verifying Processing)>

The image reading apparatus 30 reads the image on the microfilm, on which the synthesized image is formed, and generates the raster image C1' of the synthesized image to transfer the generated raster image C1' to the reproduction data inputting unit 41.

The reproduction data inputting unit 41 transfers the raster image C1' to the reproduction characteristic data extracting unit 42 and the characteristic data decoding unit 43.

When the reproduction characteristic data extracting unit 42 receives the raster image C1', the reproduction characteristic data extracting unit 42 performs the region judgment of the object region 62 using the region instructing marks 64, and extracts the raster image A1' of the object region 62 from the raster image C1'. Then, the reproduction characteristic data extracting unit 42 calculates the digest D1' of the raster image A1' to transfer the calculated digest D1' to the comparing unit 44.

The characteristic data decoding unit 43 extracts the raster image B1' of the bar code image 63 from the raster image C1'. Then, the characteristic data decoding unit 43 decodes the raster image B1' to obtain the digest D1, and transfers the obtained digest D1 to the comparing unit 44.

The comparing unit 44 compares the digest D1' with the digest D to judge whether or not the two sets of data are in agreement.

As described above, according to the present embodiment, characteristic data is extracted from the image data in a predetermined object region of a manuscript image, and region instructing marks are synthesized with the manuscript image based on the image data of the region instructing marks indicating the object region when forming the synthesized image on an image recording medium. Consequently, according to the present embodiment, it becomes possible to determine the correct object region from which the characteristic data should be extracted by means of the region instructing marks at the time of reproduction, and the possibility of the failure of the verification caused by use of an incorrect object region can be reduced.

Moreover, the system according to the present embodiment generates reproduced image data from an image recording medium on which a manuscript image is formed together with an encoded image and region instructing marks, based on image data of the manuscript image, the region instructing marks indicating a predetermined object region of the manuscript image, and the encoded image expressing the characteristic data extracted from the image data of the object region, and the present embodiment extracts reproduction characteristic data from the reproduced image data of the object region instructed by the region instructing marks. Consequently, according to the present embodiment, it is possible to accurately determine the correct object region from which the characteristic data is extracted at the time of recording, and to extract the reproduction characteristic data from the correct object region. Consequently, it is possible to decrease the possibility of the failure of the verification resulting from errors in identifying the object region.

The present invention is not limited to the embodiments described above, and can be variously modified within a scope without departing from the spirit of the present invention. For example, a part or all of the functions of the manuscript data processing apparatus 10 may be realized by the image forming apparatus 20. Similarly, a part or all of the functions of the reproduction data processing apparatus 40 may be realized by the image reading apparatus 30.

Additionally, the reproduction data processing apparatus 40 may also be configured to operate such that, when the comparing unit 44 judges that the characteristic data is not in agreement, the reproduction data processing apparatus 40 performs a predetermined image correction processing to the reproduced image data of a manuscript image, and then the reproduction data processing apparatus 40 again extracts reproduction characteristic data to compare the reproduction characteristic data with the characteristic data. Here, as the predetermined image correcting processing, removal of noise resulting from scratches, dirt, or the like on a film by a noise removing program; edge correction by an edge correcting program: and the like can all be used. When such a configuration is employed, verification can be performed again after removal of the noise generated by long-term storage or the like, making it possible to avoid failure of verification due to noise. The image correcting processing described above may be an automatic correction automatically performed by the reproduction data processing apparatus 40, or may be a manual correction manually performed by a user viewing a display.

According to an aspect of the present invention, there is provided an information recording system, having: an image generating unit that generates, from input manuscript data, image data of the manuscript; a characteristic data extracting unit that extracts, from the image data, characteristic data indicating a characteristic of the image data generated by the image generating unit; a characteristic data coding unit that encodes the characteristic data; and an image forming unit that forms the image data on an image recording medium together with the encoded characteristic data.

According to another aspect of the present invention, the characteristic data extracting unit may extract characteristic data of image data of a predetermined region, and the image forming unit may further form image identifying the region on the image recording medium.

According to another aspect of the present invention, the image generating unit may display a preview image of the image data on a screen, and, when a correction operation is input by a user, correct the image data based on the correction operation.

According to another aspect of the present invention, the image generating unit may display a preview image of the image data on a screen, and, when a correction operation is input by a user, correct the image data based on the correction operation.

According to another aspect of the present invention, there is provided an information reproducing system, having: an image reading unit that reads an image from an image recording medium on which a manuscript image is formed together with encoded characteristic data which indicate a characteristic of the manuscript image; a reproduction characteristic data extracting unit that extracts, from the manuscript image, reproduction characteristic data which indicate a characteristic of the manuscript image; a characteristic data decoding unit that decodes the encoded characteristic data; and a determination unit that determines whether the reproduction characteristic data extracted by the reproduction characteristic data extracting unit and the characteristic data decoded by the characteristic data decoding unit are identical.

According to another aspect of the present invention, the image reading unit may further read a region instructing mark which instructs a predetermined region of the manuscript image; and the reproduction characteristic data extracting unit may extract the reproduction characteristic data according to the region identified by the region instructing mark.

According to another aspect of the present invention, when the determination unit determines that the reproduction characteristic data extracted by the reproduction characteristic data extracting unit and the decoded characteristic data are not identical, the information reproducing system may perform an image correcting processing on the read manuscript image, extract a second reproduction characteristic data from the corrected manuscript image, and determine whether the second reproduction characteristic data and the characteristic data are identical.

According to another aspect of the present invention, when the determination unit determines that the reproduction characteristic data extracted by the reproduction characteristic data extracting unit and the decoded characteristic data are not identical, the information reproducing system may perform an image correcting processing on the read manuscript image, extract a second reproduction characteristic data from the corrected manuscript image, and determine whether the second reproduction characteristic data and the characteristic data are identical.

According to another aspect of the present invention, there is provided an information recording and reproducing system having: an image generating unit that generates, from input manuscript data, data of a manuscript image; a characteristic data extracting unit that extracts, from the data of the manuscript image, characteristic data indicating a characteristic of the manuscript image; a characteristic data coding unit that encodes the characteristic data; an image forming unit that forms the data of the manuscript image on an image recording medium together with the encoded characteristic data; an image reading unit that reads an image from an image recording medium on which a manuscript image is formed together with encoded characteristic data to generate image data of a reproduced manuscript image and a reproduced encoded image; a reproduction characteristic data extracting unit that extracts, from the reproduced manuscript image, reproduction characteristic data which indicate a characteristic of the reproduced manuscript image; a characteristic data decoding unit that decodes the encoded characteristic data; and an output unit that outputs information about identity of the manuscript image and the reproduced manuscript image, based on the reproduction characteristic data and the decoded characteristic data.

According to another aspect of the present invention, there is provided an information recording method, having: generating, from input manuscript data, image data of the manuscript; extracting, from the image data, characteristic data indicating a characteristic of the image data; encoding the characteristic data; and forming the image data on an image recording medium together with the encoded characteristic data.

According to another aspect of the present invention, there is provided an information reproducing method having: reading an image from an image recording medium on which a manuscript image is formed together with encoded characteristic data which indicate a characteristic of the manuscript image; extracting, from the manuscript image, reproduction characteristic data which indicate a characteristic of the manuscript image; decoding the encoded characteristic data; and determining whether the reproduction characteristic data and the decoded characteristic data are identical.

According to another aspect of the present invention, there is provided a manuscript data processing apparatus, having: an image generating unit that generates, from input manuscript data, image data of the manuscript; a characteristic data extracting unit that extracts, from the image data, characteristic data indicating a characteristic of the image data generated by the image generating unit; a characteristic data coding unit that encodes the characteristic data; and an image synthesizing unit that generates image data including the image data of the manuscript and the encoded characteristic data.

According to another aspect of the present invention, there is provided a reproduction data processing apparatus, having: reproduction data inputting unit that receives reproduced image data which have been generated by reading an image from an image recording medium on which a manuscript image is formed together with encoded characteristic data which indicate a characteristic of the manuscript image; a reproduction characteristic data extracting unit that extracts, from the manuscript image, reproduction characteristic data which indicate a characteristic of the manuscript image; a characteristic data decoding unit that decodes the encoded characteristic data; and a determination unit that determines whether the reproduction characteristic data extracted by the reproduction characteristic data extracting unit and the characteristic data decoded by the characteristic data decoding unit are identical.

According to another aspect of the present invention, there is provided a storage medium readable by a computer, the storage medium storing a program of instructions executed by the computer to perform a function for processing manuscript data, the function having: generating, from input manuscript data, image data of the manuscript; extracting, from the image data, characteristic data indicating a characteristic of the image data; encoding the characteristic data; and generating image data including the image data of the manuscript and the encoded characteristic data.

According to another aspect of the present invention, there is provided a storage medium readable by a computer, the storage medium storing a program of instructions executed by the computer to perform a function for processing reproduction data, the function having: receiving reproduced image data which have been generated by reading an image from an image recording medium on which a manuscript image is formed together with encoded characteristic data which indicate a characteristic of the manuscript image; extracting, from the manuscript image, reproduction characteristic data which indicate a characteristic of the manuscript image; decoding the encoded characteristic data; and determining whether the reproduction characteristic data and the decoded characteristic data are identical.

According to another aspect of the present invention, there is provided an information reproducing system, having: an image reading unit that reads an image from an image recording medium on which a manuscript image is formed together with encoded characteristic data which indicate a characteristic of the manuscript image to generate image data of a reproduced manuscript image and a reproduced encoded image; a reproduction characteristic data extracting unit that extracts, from the reproduced manuscript image, reproduction characteristic data which indicate a characteristic of the reproduced manuscript image; a characteristic data decoding unit that decodes the encoded characteristic data; and an output unit that outputs information about identity of the manuscript image and the reproduced manuscript image, based on the reproduction characteristic data and the decoded characteristic data.

According to another aspect of the present invention, there is provided an information reproducing method, having: reading an image from an image recording medium on which a manuscript image is formed together with encoded characteristic data which indicate a characteristic of the manuscript image to generate image data of a reproduced manuscript image and a reproduced encoded image; extracting, from the reproduced manuscript image, reproduction characteristic data which indicate a characteristic of the reproduced manuscript image; decoding the encoded characteristic data; and outputting information about identity of the manuscript image and the reproduced manuscript image, based on the reproduction characteristic data and the decoded characteristic data.

According to another aspect of the present invention, there is provided a storage medium readable by a computer, the storage medium storing a program of instructions executed by the computer to perform a function for processing reproduction data, the function having: receiving reproduced image data which have been generated by reading an image from an image recording medium on which a manuscript image is formed together with encoded characteristic data which indicate a characteristic of the manuscript image; extracting, from the reproduced manuscript image, reproduction characteristic data which indicate a characteristic of the reproduced manuscript image; decoding the encoded characteristic data; and outputting information about identity of the manuscript image and the reproduced manuscript image, based on the reproduction characteristic data and the decoded characteristic data.

What is claimed is:

1. An information recording system, comprising:
   an image generating unit that generates, from input manuscript data, image data;
   a characteristic data extracting unit that extracts, from the image data, characteristic data indicating a characteristic of the image data generated by the image generating unit;
   a characteristic data coding unit that encodes the characteristic data; and
   an image forming unit that forms a human-discernible image on an image recording medium together with the encoded characteristic data, the human-discernible image corresponding to the input manuscript data;
   said image generating unit displaying a preview image of the image data on a screen, and, when a correction operation is input by a user, correcting the image data based on the correction operation;
   said characteristic data extracting unit extracting characteristic data of image data of a predetermined region;
   said image forming unit forming an image identifying the predetermined region on the image recording medium.

2. An information reproducing system, comprising:
   an image reading unit that reads a human-discernible image from an image recording medium on which a human-discernible manuscript image is formed together with encoded characteristic data which indicate a characteristic of the manuscript image, generates electronic manuscript image data from the manuscript image formed on the recording medium, and generates electronic encoded characteristic data from the encoded characteristic data formed on the recording medium;
   a reproduction characteristic data extracting unit that extracts, from the electronic manuscript image data, reproduction characteristic data which indicate a characteristic of the manuscript image formed on the image recording medium;
   a characteristic data decoding unit that decodes the electronic encoded characteristic data; and
   a determination unit that determines whether the reproduction characteristic data extracted by the reproduction characteristic data extracting unit and the decoded electronic encoded characteristic data are identical;
   wherein when the determination unit determines that the reproduction characteristic data extracted by the reproduction characteristic data extracting unit and the decoded characteristic data are not identical, the information reproducing system performs an image correcting processing on the read manuscript image, extracts a second reproduction characteristic data from the corrected manuscript image, and determines whether the second reproduction characteristic data and the characteristic data are identical.

3. The information reproducing system according to claim 2, wherein the image reading unit further reads a region instructing mark which instructs a predetermined region of the manuscript image; and
   the reproduction characteristic data extracting unit extracts, from the electronic manuscript image data, the reproduction characteristic data according to the region identified by the region instructing mark.

4. An information recording and reproducing system comprising:
- an image generating unit that generates, from input manuscript data, image data;
- a characteristic data extracting unit that extracts, from the image data, characteristic data indicating a characteristic of the manuscript image;
- a characteristic data coding unit that encodes the characteristic data;
- an image forming unit that forms a human-discernible image on an image recording medium together with the encoded characteristic data, the human-discernible image corresponding to the manuscript image;
- an image reading unit that reads a human-discernible image from an image recording medium on which the human-discernible image is formed together with encoded characteristic data to generate image data of reproduced manuscript image data and reproduced encoded characteristic data;
- a reproduction characteristic data extracting unit that extracts, from the reproduced manuscript image data, reproduction characteristic data which indicate a characteristic of the reproduced manuscript image;
- a characteristic data decoding unit that decodes the reproduced encoded characteristic data; and
- an output unit that outputs information about identity of the manuscript image and the reproduced manuscript image, based on the reproduction characteristic data and the decoded characteristic data;
- said reproduction characteristic data extracting unit, when said output unit determining that the reproduction characteristic data extracted by said reproduction characteristic data extracting unit and said decoded characteristic data are not identical, performing an image correcting processing on the reproduced manuscript image data and extracting a second reproduction characteristic data from the corrected reproduced manuscript image data;
- said output unit determining whether the second reproduction characteristic data and the decoded characteristic data are identical.

5. An information reproducing method comprising:
- reading, using a scanning device, a human-discernible image from an image recording medium, the human-discernible image including a manuscript image and encoded characteristic data, the encoded characteristic data indicating a characteristic of the manuscript image;
- extracting, from the read manuscript image, reproduction characteristic data which indicate a characteristic of the manuscript image;
- decoding the read encoded characteristic data;
- determining whether the reproduction characteristic data and the decoded characteristic data are identical; and
- when it is determined that the reproduction characteristic data and the decoded characteristic data are not identical,
  - performing an image correcting processing on the read manuscript image,
  - extracting a second reproduction characteristic data from the corrected manuscript image, and
  - determining whether the second reproduction characteristic data and the characteristic data are identical.

6. A reproduction data processing apparatus, comprising:
- reproduction data inputting unit that receives reproduced image data which have been generated by reading a human-discernible image from an image recording medium on which a manuscript image is formed together with encoded characteristic data which indicate a characteristic of the manuscript image;
- a reproduction characteristic data extracting unit that extracts, from the reproduced image data representing the manuscript image formed on the recording medium, reproduction characteristic data which indicate a characteristic of the manuscript image;
- a characteristic data decoding unit that decodes encoded characteristic data obtained from the reproduced encoded characteristic data image data; and
- a determination unit that determines whether the reproduction characteristic data extracted by the reproduction characteristic data extracting unit and the characteristic data decoded by the characteristic data decoding unit are identical;
- wherein when the determination unit determines that the reproduction characteristic data extracted by the reproduction characteristic data extracting unit and the decoded characteristic data are not identical, the information reproducing system performs an image correcting processing on the read manuscript image, extracts a second reproduction characteristic data from the corrected manuscript image, and determines whether the second reproduction characteristic data and the characteristic data are identical.

7. A non-transitory storage medium readable by a computer, the storage medium storing a program of instructions executed by the computer to perform a function for processing reproduction data, the function comprising:
- receiving reproduced image data which have been generated by reading a human-discernible image from an image recording medium on which a manuscript image is formed together with encoded characteristic data which indicate a characteristic of the manuscript image;
- extracting, from the reproduced image data representing the manuscript image formed on the recording medium, reproduction characteristic data which indicate a characteristic of the manuscript image;
- decoding encoded characteristic data obtained from the reproduced encoded characteristic data image data;
- determining whether the reproduction characteristic data and the decoded characteristic data are identical; and
- when it is determined that the reproduction characteristic data and the decoded characteristic data are not identical,
  - performing an image correcting processing on the read manuscript image,
  - extracting a second reproduction characteristic data from the corrected manuscript image, and
  - determining whether the second reproduction characteristic data and the characteristic data are identical.

8. An information reproducing system, comprising:
- an image reading unit that reads a human-discernible image from an image recording medium on which a manuscript image is formed together with encoded characteristic data which indicate a characteristic of the manuscript image to generate reproduced manuscript image data and reproduced encoded characteristic data image data;
- a reproduction characteristic data extracting unit that extracts, from the reproduced manuscript image data representing the manuscript image formed on the recording medium, reproduction characteristic data which indicate a characteristic of the reproduced manuscript image;

a characteristic data decoding unit that decodes encoded characteristic data obtained from the reproduced encoded characteristic data image data; and an output unit that outputs information about identity of the manuscript image and the reproduced manuscript image, based on the reproduction characteristic data and the decoded characteristic data;

said reproduction characteristic data extracting unit, when said output unit determining that the reproduction characteristic data extracted by said reproduction characteristic data extracting unit and said decoded characteristic data are not identical, performing an image correcting processing on the reproduced manuscript image data and extracting a second reproduction characteristic data from the corrected reproduced manuscript image data;

said output unit determining whether the second reproduction characteristic data and the decoded characteristic data are identical.

9. An information reproducing method, comprising:

reading, using a scanning device, a human-discernible image from an image recording medium on which a manuscript image is formed together with encoded characteristic data which indicate a characteristic of the manuscript image to generate reproduced manuscript image data and reproduced encoded characteristic data image data;

extracting, from the reproduced manuscript image data representing the manuscript image formed on the recording medium, reproduction characteristic data which indicate a characteristic of the reproduced manuscript image;

decoding encoded characteristic data obtained from the reproduced encoded characteristic data image data;

outputting information about identity of the manuscript image and the reproduced manuscript image, based on the reproduction characteristic data and the decoded characteristic data;

performing, when the extracted reproduction characteristic data and the decoded characteristic data are not identical, an image correcting processing on the reproduced manuscript image data and extracting a second reproduction characteristic data from the corrected reproduced manuscript image data; and determining whether the second reproduction characteristic data and the decoded characteristic data are identical.

10. A non-transitory storage medium readable by a computer, the storage medium storing a program of instructions executed by the computer to perform a function for processing reproduction data, the function comprising:

receiving reproduced image data which have been generated by reading a human-discernible image from an image recording medium on which a manuscript image is formed together with encoded characteristic data which indicate a characteristic of the manuscript image;

extracting, from the reproduced image data representing the manuscript image formed on the recording medium, reproduction characteristic data which indicate a characteristic of the reproduced manuscript image;

decoding encoded characteristic data obtained from the reproduced image data;

outputting information about identity of the manuscript image and the reproduced manuscript image, based on the reproduction characteristic data and the decoded characteristic data;

performing, when the extracted reproduction characteristic data and the decoded characteristic data are not identical, an image correcting processing on the reproduced manuscript image data and extracting a second reproduction characteristic data from the corrected reproduced manuscript image data; and determining whether the second reproduction characteristic data and the decoded characteristic data are identical.

* * * * *